3,176,919
MODULATED CONTROL SYSTEM
Hubert T. Sparrow, Edina, Minn., assignor to Honeywell Inc., a corporation of Delaware
Filed Mar. 7, 1963, Ser. No. 263,577
7 Claims. (Cl. 236—68)

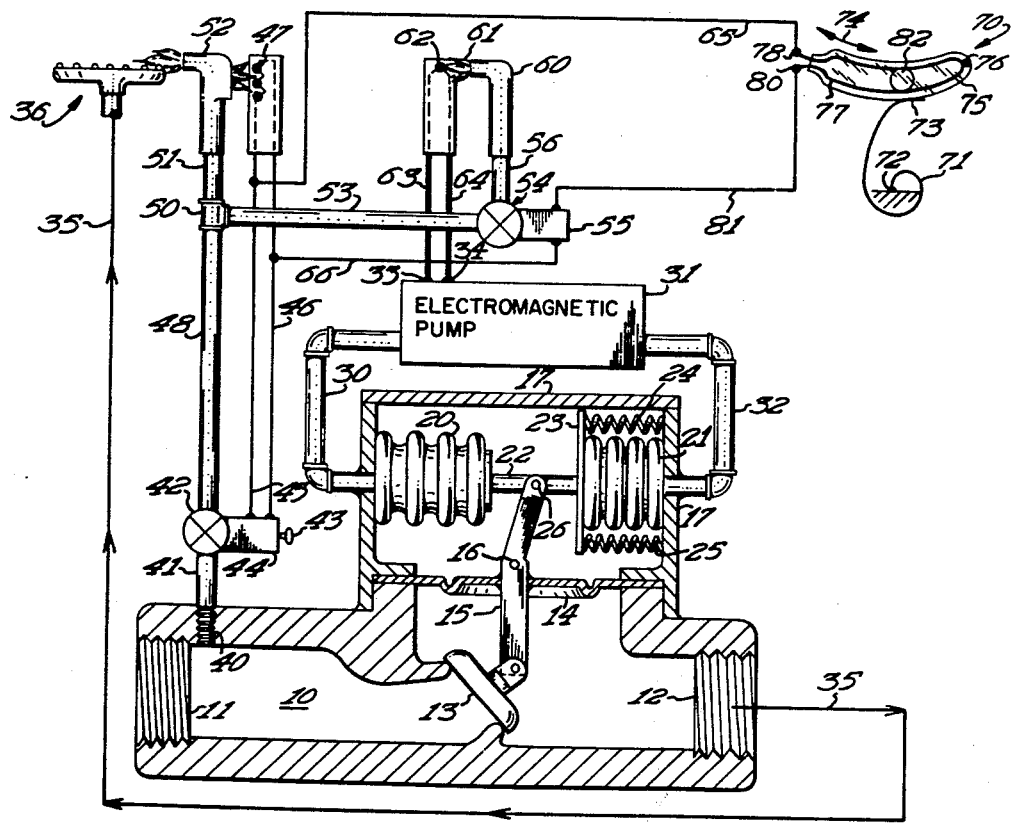
FIG 1
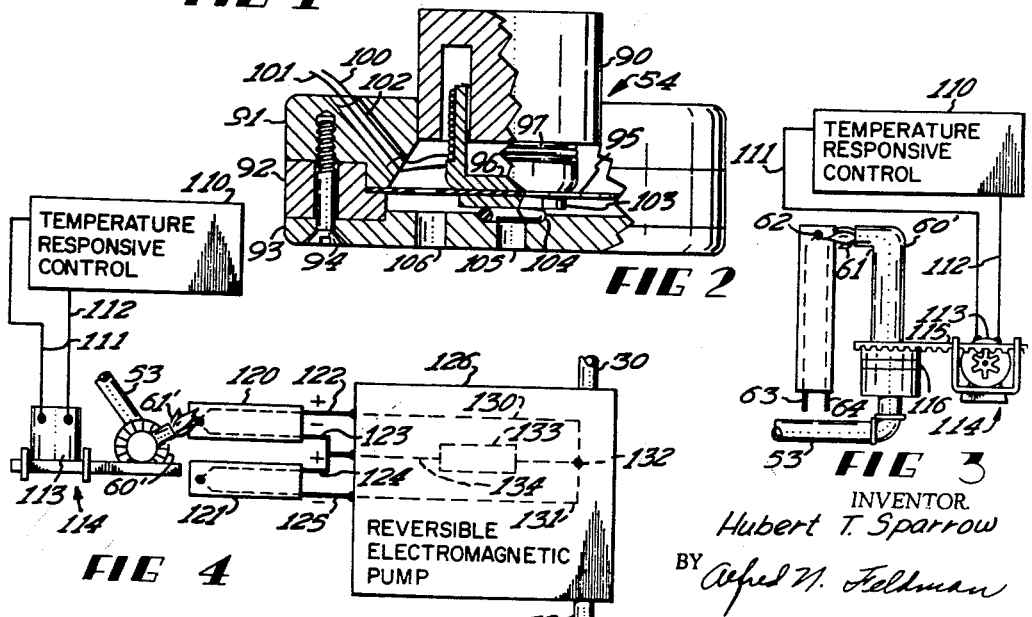
FIG 2
FIG 3
FIG 4
INVENTOR.
Hubert T. Sparrow
BY Alfred N. Feldman
ATTORNEY United States Patent Office 3,176,919
Patented Apr. 6, 1965

The present invention is directed to a modulated control device or system, and, more particularly, is directed to a system which utilizes an electromagnetic conductive fluid pump and conductive fluid actuator to operate a control device in response to a variable current generator.

In recent years, a new type of electrically controlled actuator has been developed and marketed, wherein an electromagnetic conductive fluid pump moves fluid into and out of variable volume chambers to provide motion to control some further device, such as a valve. This type of device is fully disclosed and described in the Carlson, Jr., Patent No. 2,948,118. A conductive fluid pump can be operated either as a two-position device or in a modulating fashion. The two-position device is accomplished by either energizing or deenergizing the pump, while the modulating device is accomplished by varying the amount of current supplied to the pump. The utilization of a modulating conductive fluid pump and actuator has for the most part been impractical in the past, because a very large current at low voltage must be supplied and controlled to obtain modulation. Obtaining this current and controlling it has been impractical, as far as cost is concerned. A number of proposed methods of obtaining modulation have been suggested and certain of these have been covered in issued patents. A typical means of obtaining modulation is disclosed in the Cole Patent No. 3,066,607. In that patent, modulation is obtained by varying the effect of the magnetic field and no attempt is made to vary the current to the device, as the nature of the current supplied makes it difficult to vary in a controlled fashion at an economical cost, as far as the supply equipment is concerned.

It has become apparent that the major problem in obtaining a modulating device with an electromagnetic fluid pump and actuator lies in supplying a means of generating a variable voltage at exceedingly low potential and high current in a very economical fashion. This type of variable current at low voltage is available from many devices, but they are exceedingly complex and costly. There are numerous types of generators, batteries, fuel cells, transistorized inverters, and other such units which are capable of developing a low voltage at high current and which can be readily controlled. However, these devices add an expense that is not tolerable in competitive control equipment. As such, their use with a conventional electromagnetic conductive fluid pump and actuator is not practical, even though it is possible.

The present invention has for its primary object to supply a modulating control system that uses a conductive fluid pump and actuator, and that can be controlled by varying a heat source to a heat responsive type generator.

Still a further object of the present invention is to disclose a conductive fluid pump and actuator that is controlled by the current from a single thermocouple and which current control results from positioning and/or varying the intensity of a flame that is economically available.

Another object of the present invention is to disclose a modulating control system that utilizes a conductive fluid pump and actuator and that can be controlled by varying a heat source to a heat responsive type generator wherein the system inherently incorporates feedback to give stable or hunt-free control.

Yet another object of the present invention is to disclose a conductive fluid pump and actuator controlled by a current that is generated by a pair of thermocouples that are in electrical opposition so that a reversible and modulating electric current is available to a reversible type of electromagnetic conductive fluid pump.

And still a further object of the present invention is to disclose a self-contained temperature control system that modulates the position of a gas valve in response to a varying output from a thermostat to provide a system for control of a device such as a gas furnace.

These and other objects will become apparent when the present invention is fully considered along with the drawings, wherein:

FIGURE 1 is a schematic representation of a wholly self-contained temperature control system utilizing heating gas as supplied to a valve for space heating, the generation of the electric potential for the self-contained system, and its fail safe protective devices, and for the generation of the electric potential that is modulated to control the electromagnetic pump and actuator;

FIGURE 2 is a cross-section of a modulating control valve for the system of FIGURE 1;

FIGURE 3 is a simplified disclosure of another means of modulating the electrical output of a thermocouple to provide energy to an electromagnetic conductive fluid pump; and FIGURE 4 is a schematic representation of two thermocouples in electrical opposition for reversing power to an electromagnetic conductive fluid pump for control in a system as disclosed in FIGURE 1.

In FIGURE 1, there is generally disclosed at 10 gas valve means having an inlet 11 and an outlet 12 with a valve 13 interposed to control the flow of gas supplied to inlet 11. The valve means 10 is sealed by a flexible diaphragm 14 through which a lever arm 15 extends and is pivoted at 16. Sealing the diaphragm 14 to the valve means 10 is a housing 17 that protects and supports an electromagnetic conductive fluid actuator. This actuator could be of the type disclosed in the previously mentioned Carlson, Jr., patent, and is disclosed in a simplified form in the present application to provide a complete understanding of the operation of the system.

Housing 17 supports a pair of bellows 20 and 21 that are supported in any convenient fashion from the housing 17. A connecting member 22 is joined at one end to bellows 20 and to a plate 23 at its opposite end. The plate 23 is joined to bellows 21 and is attracted to the housing 17 by a pair of springs 24 and 25. The springs 24 and 25 keep the bellows 21 compressed when the device is deenergized. The springs also apply a force to bellows 20 thereby keeping it fully extended when the device is deenergized. A pivot 26 is provided between the member 22 and the arm 15 to provide a rocking motion about pivot 16 to operate the valve 13 whenever there is movement of the bellows 20 and 21.

Bellows 20 is connected by a pipe 30 to one side of an electromagnetic conductive fluid pump 31 which in turn is joined back to bellows 21 by pipe 32. The electromagnetic conductive fluid pump has a pair of electrical terminals 33 and 34 to which electrical energy is supplied in a manner that will be described subsequently in the present specification. The valve, actuator, and electromagnetic conductive fluid pump that have been described so far, for all practical purposes, are equivalent to the Carlson et al. disclosure of Patent No. 2,948,118.

The outlet 12 of valve means 10 is connected to a pipe 35 that in turn is connected to a burner, generally shown at 36. The burner 36 can be, for example, the burner in a conventional gas furnace and which obtains its gas flow from valve means 10. Also connected into valve means 10, at a threaded opening 40, is a pipe 41 going to a safety valve 42 that is manually set by knob 43 and electromagnetically held by a coil means 44 when sufficient power is supplied on conductors 45 and 46 from a thermopile or group of thermocouples 47 under proper conditions. The valve 42 and its associated setting mechanism and coil are conventional in gas furnace safety systems and are believed well known in the art to need no further description. Pipe 48 supplies gas to a T 50 which in turn supplies gas to pipe 51 to a pilot burner 52 that supplies a continuous flame, once initially lit, to the thermopile 47 and to ignite the burner 36 when gas is supplied in pipe 35. Once again, the pilot burner 52 is of a conventional design and completes the necessary equipment to provide a self-contained pilot safety gas burner system of a type well-known in the burner art.

At this point, the self-contained system of FIGURE 1 departs somewhat from the conventional and basically forms the heart of the present invention. The T 50 supplies gas in pipe 53 to a small modulating control valve 54 that is electromagnetically operated by electromagnetic means 55 and which has an outlet in pipe 56. The valve 54 and operator 55 will be described in some detail in FIGURE 2. For the time being, it is sufficient to understand that the valve 54 opens in proportion to the current flowing in the electromagnetic actuator 55 thereby supplying a varying level of gas. The pipe 56 is shown going to a gas burner 60 which in turn supplies a flame 61 to a relatively heavy single thermocouple 62 that has its output connected to terminals 33 and 34 of the electromagnetic conductive fluid pump by conductors 63 and 64. The burner 60, while it has been shown separated from the pilot burner 52, would be in close enough proximity to burner 52 to ignite flame 61 upon a supply of gas being allowed to pass through the valve 54. The intensity of the flame 61 varies with the amount of the opening of the valve 54 and this is controlled in a fashion that will become apparent.

The powerpile 47 supplies power on conductors 65 and 66, and which are electrically connected to the conductors 45 and 46. The conductor 66 is supplied to one terminal of the valve 54 at the electromagnetic operator 55, while the second conductor 65 is connected to a thermostat generally shown at 70. The thermostat 70 can be of any type wherein a varying electrical resistance is provided with changes in temperature. The thermostat 70 has been specifically disclosed as a bimetal element 71 fixed at 72 and which therefore has an end 73 that moves as indicated at arrow 74. The movement will be either to the right or left depending on whether a temperature rise or temperature fall occurs. Mounted at 73 is a glass tube 75 that has a support 76 at one end that mounts a resistance wire 77 that passes through the length of the tube 75 twice. The resistance wire 77 is connected at one end 78 to the conductor 65 and at the other end 80 to a conductor 81 that completes an electric circuit through the electromagnetic actuator 55. A globule of mercury 82 rolls in the glass tube 75 as the temperature changes and the point 73 is caused to move along the directions indicated by arrow 74. The movement of the globule 82 of mercury tends to short out part of the resistance wire 77 thereby varying the electrical resistance of the thermostat 70. When the globule of mercury 82 is at the support 76, little or none of the resistance wire 77 is shorted out thereby providing a maximum resistance between the ends or conductors 78 and 80. When the globule of mercury 82 is at the left end of the tube 75, all of the resistance wire 77 is shorted out of the electric circuit that is formed between the conductors 78 and 80. As such, a varying resistance is applied to the circuit which incorporates the valve 54 and the actuator 55. It is thus apparent as the temperature changes at thermostat 70, that the electric current flowing through the actuator 55 varies thereby changing the position of the valve 54. This changes the intensity of flame 61 thereby changing the output of the thermocouple 62 on conductors 63 and 64. This varying electrical energy is supplied to terminals 33 and 34 of the electromagnetic conductive fluid pump and the pumping action of this unit therefore varies with the temperature in response to thermostat 70.

It is obvious that if fluid is pumped from the bellows 20 through the electromagnetic pump 31 to the bellows 21, the bellows change position by moving to the left. As they move to the left, the lever 15 is pivoted about pivot point 16 causing the valve 13 to be lifted thereby supplying a flow of gas between the valve inlet 11 and outlet 12 to supply gas to burner 36. As this gas is supplied, it is ignited by the pilot burner 52 in a conventional fashion. The position of the valve 13 varies depending on the amount of resistance in the circuit to valve 54 as controlled by thermostat 70. When the thermostat 70 shorts all of the resistance wire 77 out of the electric circuit, the flame 61 is at a maximum and the potential generated on conductors 63 and 64 of the thermocouple 62 is at a maximum. The electromagnetic conductive fluid pump 31 has been selected so that under these conditions, the pump 31 moves a substantial amount of fluid from the bellows 20 to bellows 21, thereby opening the valve means 13 to a maximum condition. Upon a change or decrease in the energization of the pump 31, the springs 24 and 25 force the conductive fluid contained in an electromagnetic conductive fluid pump back through the pump from bellows 21 to bellows 20 thereby tending to close the valve 13. Upon the closing of valve 54, thereby removing flame 61, the springs 24 and 25 cause the device disclosed in FIGURE 1 to close completely thereby cutting off all flow of gas to the burner 36. This then removes the heat from the furnace allowing the system to complete its operation.

Tests runs on a system of the type disclosed in FIGURE 1 have shown that a single thermocouple 62 is capable of generating a voltage of 40 millivolts with an internal resistance of 0.005 ohm. This type of thermocouple when combined in an electromagnetic conductive fluid pump has delivered as high as 6.5 amperes in a fully modulated fashion. With 6.5 amperes supplied to the test pump utilized, a pumping pressure of approximately 5½ pounds per square inch of a conductive fluid were available for operating an actuator of the conductive fluid type. In this particular device, the fluid utilized has been a combination of sodium and potassium well-known in the art as NaK. A full range of modulation of a gas valve was accomplished and the completed system operated under varying conditions and with variations as will be described below.

In FIGURE 2, there is disclosed a cross-section of a valve of the type utilized in the system of FIGURE 1. The cross-section of FIGURE 2 has been supplied as a means of clarifying one area of the present invention, even though the valve itself is of a known type. In FIGURE 2, the valve 54 is formed having a permanent magnet 90 of a type referred to as a "speaker magnet." The permanent magnet 90 is supported by a non-magnetic metallic block 91 which is sealed to a ring 92 of non-magnetic material which in turn is connected to a plate 93, also of a non-magnetic material. The members 91, 92, and 93 are all annular in general configuration and are held together by a plurality of non-magnetic screws 94. Clamped between the ring 92 and the member 91 is a spring 95 that positions a non-magnetic cup 96 that has a coil 97 wound around it. The coil 97 partially extends into the permanent magnet 90 and varies in position depending on the amount of current flow through coil 97. A pair of conductors 100 and 101 extend through the member 91 in a sealed fashion at 102 and connect the coil 97 to the conductors 81 and 66 of the system disclosed in FIGURE 1. The spring 95 which supports the magnetic cup 96 is a flat, circular type of spring that has a number of open areas for free flow of fluid so that the spring does not separate the internal parts of the valve, but the internal parts of the valve are free and exposed to the gas that flows in the unit. Supported on the spring 95 is a second member 103 that rests on an O-ring 104 that encircles an inlet port 105 of the valve 54. The inlet port 105 is connected to pipe 53 of the disclosure of FIGURE 1. An outlet 106 is provided through the member 93 and is connected to pipe 56 of the disclosure of FIGURE 1. The valve disclosed in FIGURE 2 is capable of being modulated in gas flow by varying the current to the valve 54 in the fashion described. It has been found that small valves can be modulated electromagnetically in this fashion whereas larger valves of the type disclosed at 10 in FIGURE 1 cannot be. As such, the present small valve provides a means of modulating a much larger valve.

In addition to controlling the gas flow from the burner 60 and thereby varying the intensity of the flame 61 on the thermocouple 62, other means of varying the flame intensity on the thermocouple 62 or controlling voltage output from the thermocouple 62 are available. In FIGURE 3, a simple arrangement wherein the flame is caused to vary in intensity on the thermocouple 62 is provided by moving the flame in and out of engagement with the thermocouple 62 without any change of intensity of the flame. More specifically, in FIGURE 3, a temperature responsive control 110 is provided and for the most part incorporates a power source and thermostat so that a varying amount of electrical power can be supplied on conductors 111 and 112 to a motor 113. The motor 113 drives a rack and pinion 114 which in turn operates a rack 115 on the side of a pivoted burner 60'. The burner 60' pivots at joint 116 and this joint is connected to pipe 53 which corresponds to the numbering in FIGURE 1. A thermocouple 62 is again provided with a flame 61'. In the disclosure of FIGURE 3, the temperature responsive control 110 provides a varying amount of electrical energy to the motor 113 to move the rack and pinion 114. This causes the pilot burner 60' to rotate thereby moving the flame 61' into and out of engagement with the thermocouple 62. The thermocouple 62 has output conductors 63 and 64 that correspond to the same conductors as are shown in FIGURE 1. It is thus apparent that by rotating the flame 61' into and out of engagement with the thermocouple 62 that a varying amount of electric potential is generated between conductors 63 and 64.

It should be noted that while the applicant has discussed the present system in terms of electric current, the output of a thermocouple such as thermocouple 62 both varies in current and voltage when the flame 61' is varied against the thermocouple 62. For simplicity, the description has been of a varying current and since the resistance of the external circuit remains substantially constant, it is obvious to one skilled in the electrical arts that a varying voltage also exists. For the purposes of the present disclosure, the current has been described as the varying member, where in reality the amount of power available varies. The terminology of varying current has been carried on into the claims of the present application, but it is understood that the varying heat supplied to the generator, where it is of the thermocouple type, varies the output power which is reflected in the change in current.

In FIGURE 4, a temperature responsiev control 110 is again disclosed with output conductors 111 and 112, which are connected to a motor 113 and a rack and pinion 114. The same pivotal burner 60', having a flame 61', is supplied by gas from pipe 53. In effect, the disclosure of FIGURE 4 to this point is a top view of the structure disclosed in FIGURE 3. However, the flame 61' in FIGURE 4 is directed against a pair of thermocouples 120 and 121 which have electrical outputs respectively on conductors 122 and 123, and on conductors 124 and 125. The conductors 123 and 124 are connected together and the output of the pair of thermocouples 120 and 121 are in opposition to one another when connected to a reversible electromagnetic conductive fluid pump 126. The internal construction of the pump 126 has not been shown except for the connection of the phantom representation of conductors 130 and 131, which are connected to the conductors 122 and 125. These conductors are joined at 132 and are connected to the pumping gap 133 of the reversible pump 126. The other side of the gap 133 is connected by conductor 134 to the common connection of conductors 123 and 124. The polarities of the generated potential of the thermocouples 120 and 121 has been noted and it is obvious that when the thermocouple 120 is energized by the flame 61', the current flow through the gap 133 is in one direction. When the flame 61' has been rotated to energize the thermocouple 121, the current flow through the gap 133 is reversed. A position of the flame 61' intermediate the two thermocouples 120 and 121 provides a current in conductors 130 and 131 that is equal and the net flow of current through the gap 133 is zero.

A reversible electromagnetic conductive fluid pump of a type disclosed at 126 is well known in the art and will not be described in detail. It is well known that direct current electromagnetic conductive fluid pumps can be reversed by reversing the current flow through their pumping channel and the details of structure are believed to be unnecessary in the present disclosure.

It becomes apparent in FIGURE 4 that a reversible electromagnetic pump can be modulated by varying the heat to a pair of thermocouples that are connected in opposition to one another. In the case where a reversible electromagnetic conductive fluid pump is used in an actuator of the type disclosed in FIGURE 1, the springs 24 and 25 are unnecessary as the position of the bellows 20 and 21 can be changed in both directions by the direction of pumping of the reversible electromagnetic conductive fluid pump. It is obvious that the disclosure of FIGURE 4 can be connected into the system of FIGURE 1 with no difficulty and provides another means of obtaining modulation by varying the heat content supplied to a heat responsive current generator.

While it has been recognized in the liquid metal pump art that it is possible to energize a liquid metal pump from current supplied from a thermocouple or similar device, modulation or variation of the output and the resultant mechanical motion have not been recognized in any prior art devices. A typical Patent No. 2,977,050 to Sparrow discloses the idea of supplying energy to a pump from a heat responsive device. This is also known in other art, but none of this art recognizes that it would be possible to supply a varying current for modulation in the fashion shown in the present application.

In a control system of the type described, it is desirable to get some type of feedback in order to give stable "non-hunting" control of the space temperature. This requirement is caused by the lags introduced by the mass of the furnace and the supply ducts, and the inability of the thermostat to immediately sense a change in room temperature. In the present system, the feedback can be accomplished in many ways, but is also partly inherent in the system. An example of this would be if the operation is considered in the following light. In order for the gas valve 10 to initially open, a certain gas pressure must be delivered to the burner 60, in order to heat the thermocouple 62 to a sufficient level to deliver current to pump 31 to in turn open the main valve 10. When the main valve 10 opens, the gas pressure delivered to the burner 60 will naturally drop because of a change in line pressure and the fact that the valve 10 is utilizing gas. This drop in gas pressure at the pilot will result in slightly cooling the thermocouple 62 with the resulting tendency to start closing the valve 10 in anticipation of the heat that is going to arrive at the thermostat 70 at a later time. It is thus apparent that inherent feedback is incorporated in this system.

Another way to obtain inherent feedback is to place the thermocouple 62 close enough to the main burner 36 so that the cold junction of thermocouple 62 will receive some heat from the burner 36 when it is ignited. With a heat transfer between these two members, the difference between the hot and cold junctions of thermocouple 62 decreases and this decreases the electrical output to the pump 31. The disclosure of FIGURE 1 has the thermocouple 62 separated from the burner 36, but it was previously pointed out that the burner 60 was close enough that the flame 61 would result upon ignition of the burner 36.

It thus becomes apparent that a new means of modulating an electromagnetic conductive fluid pump has been provided by the applicant. In this modulation control system, a conductive fluid filled actuator and conductive fluid type pump have been connected to the actuator to move the output of the actuator in response to the current to the pump. At this point, the novelty of the present invention lies. The varying current to the pump has been supplied by a heat responsive variable current generating means that is connected to the pump. The heat responsive variable current generating means is varied in its output by applying a varying heat to the generator. The means of applying heat can be by varying the flame intensity, changing the position of the flame, or any combination of these, or by electrically varying the heating device. It is obvious from the above discussion that many possible variations are possible in the present invention. As such, the applicant does not wish to be limited to the specific disclosure contained in the drawings and specification, but wishes to be limited solely by the content of the appended claims.

I claim as my invention:

1. A gas valve control system, including: conductive fluid filled actuator means having mechanical output means connected to a gas valve; a reversible electromagnetic conductive fluid pump connected to said actuator means wherein said pump reversibly moves said fluid fill to move said actuator means and said output means to operate said gas valve; two thermocouples joined in electrical opposition and connected to said pump to provide reversible electrical energization to said pump; and directional control means supporting heating means to variably control the application of said heating means to said thermocouples to modulate and reverse the electric current to said pump; said pump and actuator means moving said output means and said valve in response to said applied heat to vary the position and direction of movement of said mechanical output means and said gas valve.

2. A control system, including: conductive fluid filled actuator means having mechanical output means; a reversible electromagnetic conductive fluid pump connected to said actuator means wherein said pump reversibly moves said fluid fill to move said actuator means and said output means; two thermocouples joined in electrical opposition and connected to said pump to provide reversible electric energization to said pump; and directional control means supporting heating means to variably control the application of said heating means to said thermocouples to modulate and reverse the electric current to said pump; said pump and actuator means moving said output means in response to said applied heat to vary the position and direction of movement of said mechanical output means.

3. A modulated gas valve control system, including: conductive fluid filled actuator means having mechanical output means connected to a gas valve; an electromagnetic conductive fluid pump connected to said actuator means wherein said pump moves said fluid fill to move said actuator means and said output means to operate said gas valve; thermocouple means connected to said pump to electrically energize said pump; and directional control means supporting a gas flame to variably control the application of said gas flame to said thermocouple means to modulate the electric current to said pump; said pump and actuator means moving said output means and said valve in response to said directional control means to in turn modulate the position of said mechanical output means and said gas valve.

4. A condition responsive control system, including: conductive fluid filled actuator means having mechanical output means; a reversible electromagnetic conductive fluid pump connected to said actuator means wherein said pump reversibly moves said fluid fill to move said actuator means and said output means; two thermocouples joined in electrical opposition and connected to said pump to provide reversible electric energization to said pump; condition responsive means having an electrical output that varies with a variable condition; and directional control means supporting heating means to control the application of said heating means in response to the electrical output of said condition responsive means to said thermocouples to modulate and reverse the electric current to said pump; said pump and actuator means moving said output means in response to said applied heat to vary the position and direction of movement of said mechanical output means which is in turn responsive to said condition responsive means.

5. A temperature responsive control system, including: conductive fluid filled actuator means having mechanical output means to operate valve means; an electromagnetic conductive fluid pump connected to said actuator means wherein said pump moves said fluid fill to move said actuator means and said valve means; heat responsive variable current generator means connected to said pump to energize said pump; thermostat means having an electrical output that varies continuously with temperature; and variable heating means controlled by said electrical output of said thermostat means and said heating means applied to said current generator means to vary the current to said pump; said pump and actuator means moving said output means with said applied heat to in turn modulate the position of said valve means in response to said thermostat means to control said temperature.

6. A condition responsive control system, including: conductive fluid filled actuator means having mechanical output means; an electromagnetic conductive fluid pump connected to said actuator means wherein said pump moves said fluid fill to move said actuator means and said output means; heat responsive variable current generator means connected to said pump to energize said pump; condition responsive means having an electrical output that varies continuously with a variable condition; and variable heating means controlled by said electrical output of said condition responsive means and said heating means applied to said current generator means to vary the current to said pump; said pump and actuator means moving said output means with said applied heat to in turn modulate the position of said mechanical output means in response to said condition responsive means.

7. An electrically modulated control system, including: conductive fluid filled actuator means having mechanical output means; an electromagnetic conductive fluid pump connected to said actuator means wherein said pump moves said fluid fill to move said actuator means and said output means; heat responsive variable current generator means connected to said pump to energize said pump; and variable heating means controlled by continuous electric signal means applied to said current generator means to vary the current to said pump; said pump and said actuator means moving said output means in response to said applied heat to in turn modulate the position of said mechanical output means as said electric signal means varies.

References Cited by the Examiner

UNITED STATES PATENTS

| | | | |
|---|---|---|---|
| 455,382 | 7/91 | Bell et al. | 236—68 |
| 528,800 | 11/94 | Perry | 236—68 |
| 2,044,427 | 6/36 | Giesler | 236—68 |
| 2,329,473 | 9/43 | Landon | 236—9 |
| 2,501,627 | 3/50 | Findley. | |
| 2,730,618 | 1/56 | Michaels. | |
| 2,869,049 | 1/59 | Dietz et al. | |
| 2,948,118 | 8/60 | Carlson et al. | |
| 2,977,050 | 3/61 | Sparrow | 236—74 X |

EDWARD J. MICHAEL, *Primary Examiner.*

ALDEN D. STEWART, *Examiner.*